(12) United States Patent
Holland et al.

(10) Patent No.: US 10,983,583 B2
(45) Date of Patent: Apr. 20, 2021

(54) ELECTRONIC DISPLAY REDUCED BLANKING DURATION SYSTEMS AND METHODS

(71) Applicant: Apple Inc., Cupertino, CA (US)

(72) Inventors: Peter F. Holland, Los Gatos, CA (US); Christopher P. Tann, San Jose, CA (US); Malcolm D. Gray, Sunnyvale, CA (US); Hari Ganesh R. Thirunageswaram, Fremont, CA (US); Kristan Jon Monsen, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/110,953

(22) Filed: Aug. 23, 2018

(65) Prior Publication Data

US 2020/0064902 A1  Feb. 27, 2020

(51) Int. Cl.
| | | |
|---|---|---|
| *G09G 5/36* | (2006.01) | |
| *G06F 1/32* | (2019.01) | |
| *G06T 1/60* | (2006.01) | |
| *G09G 5/00* | (2006.01) | |
| *G06F 1/3234* | (2019.01) | |
| *G06F 1/3296* | (2019.01) | |
| *G06T 15/00* | (2011.01) | |
| *G06T 1/20* | (2006.01) | |

(52) U.S. Cl.
CPC .......... *G06F 1/3275* (2013.01); *G06F 1/3296* (2013.01); *G06T 1/20* (2013.01); *G06T 1/60* (2013.01); *G06T 15/005* (2013.01); *G09G 5/363* (2013.01); *G09G 2330/023* (2013.01); *G09G 2360/12* (2013.01)

(58) Field of Classification Search
CPC ......... G06T 1/20; G06T 15/005; H04N 5/379; G06F 9/3885
USPC ........................................................ 345/511
See application file for complete search history.

(56) References Cited

U.S. PATENT DOCUMENTS

| | | |
|---|---|---|
| 9,262,798 B2 | 2/2016 | Bratt et al. |
| 9,529,403 B2 | 12/2016 | Gulati et al. |
| 2009/0204831 A1 | 8/2009 | Cousson et al. |
| 2011/0102448 A1* | 5/2011 | Hakura ................. G06T 15/005 345/581 |
| 2011/0134131 A1* | 6/2011 | Danilin ................... G06F 15/16 345/501 |
| 2011/0211726 A1* | 9/2011 | Moed ................. G06K 9/00986 382/100 |

(Continued)

*Primary Examiner* — Jin Cheng Wang
(74) *Attorney, Agent, or Firm* — Fletcher Yoder, P.C.

(57) ABSTRACT

The configuration buffer may be divided into partitions that may effectively function as multiple linked configuration buffers. The linked partitions may each be associated with a portion of the display pipeline (e.g., an image process block) and may each be responsible for loading configuration entries into the programmable register(s) of a portion of the display pipeline. In this manner, the partitions may load the associated programmable register(s) of the display pipeline substantially simultaneously, reducing the time used to configure the entire display pipeline. Since configuration of the display pipeline may occur during the blanking period, a reduction in display pipeline configuration time may reduce the blanking period and increase the time for driving pixels of the display, thereby improving perceived image quality (e.g., pixel yield of the display panel).

22 Claims, 11 Drawing Sheets

(56) References Cited

U.S. PATENT DOCUMENTS

| | | | |
|---|---|---|---|
| 2012/0287337 A1 | 11/2012 | Kumar et al. | |
| 2014/0351551 A1* | 11/2014 | Doerr | G06F 12/0215 |
| | | | 711/204 |
| 2015/0177821 A1* | 6/2015 | Senthinathan | G06F 9/30189 |
| | | | 713/324 |
| 2015/0269101 A1* | 9/2015 | Yamamoto | G06F 13/28 |
| | | | 710/308 |
| 2015/0310311 A1* | 10/2015 | Shi | G06F 15/8023 |
| | | | 382/158 |
| 2015/0347338 A1* | 12/2015 | Shippy | G06F 13/4221 |
| | | | 710/314 |
| 2016/0092239 A1* | 3/2016 | Maiyuran | G06F 9/321 |
| | | | 712/233 |
| 2016/0379559 A1 | 12/2016 | Yamaji | |
| 2017/0092236 A1 | 3/2017 | Tripathi et al. | |
| 2017/0287103 A1* | 10/2017 | Meixner | G06T 1/20 |
| 2017/0287105 A1* | 10/2017 | Meixner | G06F 9/30036 |
| 2018/0005075 A1* | 1/2018 | Shacham | G06K 9/46 |
| 2018/0007303 A1* | 1/2018 | Meixner | G06F 5/015 |
| 2019/0253651 A1* | 8/2019 | Shida | H01L 27/146 |

* cited by examiner

ELECTRONIC DISPLAY REDUCED BLANKING DURATION SYSTEMS AND METHODS

BACKGROUND

The present disclosure relates generally to electronic displays and, more particularly, to reducing blanking (e.g., vertical blanking (VBlank)) duration implemented by an electronic display.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information (e.g., text, still images, video) based on corresponding image data. For example, such electronic devices may include computers, mobile phones, portable media devices, virtual-reality headsets, and vehicle dashboards, among many others. In any case, to display an image, an electronic display may control light emission (e.g., luminance) of its display pixels based at least in part on corresponding image data. To facilitate improving perceived image quality, in some instances, an electronic device may include a display pipeline (e.g., image data processing circuitry) that processes image data before an electronic display uses the image data to display a corresponding image (e.g., image frame).

In some instances, operation of a display pipeline may be programmed (e.g., adjusted) based at least in part on configuration data. In fact, to facilitate improving perceived image quality, the display pipeline may vary processing performed on image data corresponding with different images, for example, based at least in part on image content and/or environmental conditions present. As such, before processing image data corresponding with an image during an image data processing period, operation of image data processing circuitry implemented in the display pipeline may be programmed based on configuration data corresponding with the image, for example, by storing the configuration data in programmable registers of the image data processing circuitry during a programming period, which occurs during a (e.g., vertical) blanking period directly before the image data processing period.

However, at least in some instances, duration of blanking periods implemented by an electronic display may vary based on various factors, such as refresh rate of the electronic display, resolution (e.g., dimensions) of the electronic display, line time of the electronic display, and/or the like. In fact, in some instances, it may be desirable to reduce duration of blanking periods, for example, to provide compatibility with higher resolution electronic displays and/or to enable increasing line (e.g., scan) time implemented by an electronic display, which, at least in some instances, may facilitate improving perceived image quality. Since occurring during blanking periods, duration of programming periods, during which operation of a display pipeline is programmed, may limit ability to reduce duration of the blanking periods.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving perceived image quality of information visually presented on electronic displays of electronic devices including a display pipeline, for example, which processes image data before the image data is used to display a corresponding image on an electronic display. In some embodiments, operation of the display pipeline may be programmable, for example, to adaptively adjust operations performed by the display pipeline on image data corresponding to different images. In fact, display pipeline operations may be programmed to appropriately process image data based on environmental conditions and/or image content itself.

Further, in some embodiments, the display pipeline may include a configuration buffer that holds multiple configuration entries, which each correspond to a display pipeline configuration associated with, for example, an image frame. Each configuration entry may include configuration data and information on the image data processing block(s) to be programmed using the configuration data. That is, the image data processing circuitry of the display pipeline may be programmed based on the configuration data. Programming of the image data processing circuitry may occur during a blanking period that is periodically punctured by a refresh period during which the display may write (e.g., refresh) to the display pixels for a duration of time (e.g., line time) with image data processed by the display pipeline. As such, the display pipeline configuration period (e.g., programming period) may be less than or equal to the blanking period and may act as a lower limit on the blanking period.

In some cases, reducing the blanking period duration may facilitate improving perceived image quality, for example, by enabling the electronic display to implement higher (e.g., greater than 60 Hz) refresh rates and/or increasing the duration of the refresh period and, thus, line time used to write (e.g., refresh) each line (e.g., row or column) of the display pixels. However, in some embodiments, the duration of the blanking period may be reduced no less than the duration of the time used to program the display pipeline (e.g., programming period) to ensure proper programming of the image processing circuitry for each image frame.

Accordingly, the present disclosure provides techniques for implementing and/or operating a configuration buffer in a display pipeline, for example, to facilitate improving perceived image quality when image data output from the display pipeline is used to display a corresponding image. In some embodiments, a configuration buffer may be implemented with multiple partitions, each storing configuration entries (e.g., address and configuration data) corresponding to a different portion of the display pipeline. For example, a first configuration buffer partition may store configuration entries corresponding with a first group of one or more image data processing blocks implemented in the display pipeline while a second configuration buffer partition stores configuration entries corresponding with a second group of one or more image data processing blocks implemented in the display pipeline.

In some embodiments, implementing multiple configuration buffer partitions may enable a display pipeline to program different portions of its image data processing circuitry in parallel. For example, during the same clock cycle, the first configuration buffer partition may output a first configuration entry, which identifies a first image data processing block and includes first configuration data, and the second configuration buffer partition may output a second configuration entry, which identifies a second image data processing block and includes second configuration data. Based on the output configuration entries, the display pipeline may program the first image data processing block and the second image data processing block in parallel, for example, by storing the first configuration data in a first programmable register of the first image data processing block and storing the second configuration data in a second programmable register of the second image data processing block. In this manner, a configuration buffer implemented with multiple partitions may facilitate reducing the minimum duration sufficient to program a display pipeline and, thus, duration of the blanking period.

Moreover, in some embodiments, reduction of duration programming periods may vary with implementation of the partitioned configuration buffer, for example, due to the programming duration sufficient for the slowest configuration buffer partition acting as a lower bound. Thus, in some embodiments, implementation of a partitioned configuration buffer may be designed to balance programming duration sufficient for each of its configuration buffer partitions to program an associated portion of the display pipeline, for example, such that each configuration buffer partition reaches an end marker at approximately the same time (e.g., within one or two clock cycles). In some embodiments, the configuration buffer partitions may be balanced by analyzing properties of programmable registers of the image data processing blocks, operational interrelationship between image data processing blocks, and/or physical relationship between image data processing blocks which may allow image data processing blocks to be grouped together and thus facilitate the reduction of the programming period and the blanking period.

To facilitate improving power consumption efficiency, in some embodiments, an electronic device may power gate its display pipeline when the display pipeline is idle, for example, by electrically disconnecting a power source from the display pipeline. For example, the display pipeline may be idle when the display pipeline is not programming its image data processing circuitry and not processing image data, which generally occurs during blanking periods. Thus, in some embodiments, a blanking period may include an idle (e.g., power gate) period in addition to a programming period whereby the duration of the blanking period may be greater (e.g., longer) than the programming period, for example, to accommodate a non-overlapping power gate period during the blanking period.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
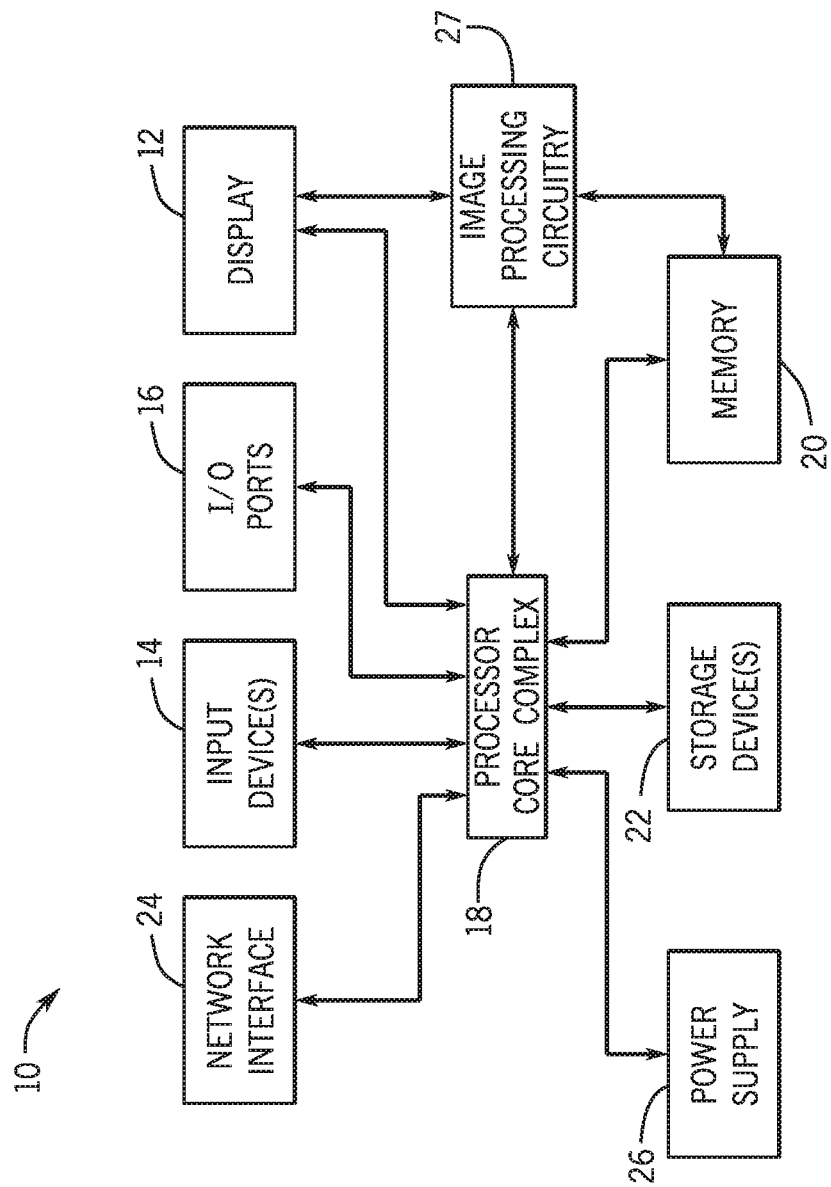
FIG. 1 is a block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to electronic displays, which may be implemented to present visual representations of information, for example, in one or more images (e.g., image frames). Generally, an electronic display may display an image by controlling light emission and, thus, perceived luminance of its display pixel based at least in part on corresponding image data. To facilitate improving perceived image quality, in some instances, a display pipeline may be implemented to process image data before an electronic display uses the image data to display a corresponding image. In particular, the display pipeline may include image data processing circuitry, for example, organized into one or more image data processing blocks that operate to perform various operations on image data.

To facilitate further improving perceived image quality, in some instances, operation of the image data processing circuitry may be programmable, for example, to enable varying operations performed on image data corresponding with different images. At least in some instances, this may enable operation of the image data processing circuitry to be adaptively (e.g., dynamically) adjusted, for example, based at least in part on image content and/or environmental (e.g., ambient lighting) conditions. In fact, in some instances, each image may be associated with a display pipeline configuration to be implemented by the image data processing circuitry while processing corresponding image data.

To facilitate coordinating implementation of the various display pipeline configurations, in some instances, a display pipeline may include a configuration buffer that stores configuration entries, for example, which each include configuration data and identifies a corresponding image data processing block to be programmed using the configuration data. In fact, in some instances, this may enable display pipeline configurations corresponding with multiple different images to be stored (e.g., queued) in the configuration buffer, for example, such that configuration entries corresponding to the same image are grouped together and groups of configuration entries corresponding to different images are separated by end markers. Thus, to implement a display pipeline configuration associated with an image, the display pipeline may program its image data processing circuitry based on corresponding configuration entries, for example, by storing configuration data included in a configuration entry into a programmable register of an image data processing block identified by the configuration entry.

After programming, the image data processing circuitry may operate based on the display pipeline configuration to process image data during an image data processing period, for example, to facilitate improving perceived image quality by accounting for image content and/or environmental conditions. Additionally, based at least in part on processed image data received from the display pipeline, an electronic display may control light emission from its display pixels to display a corresponding image. In particular, the electronic display may write (e.g., refresh) its display pixels during a refresh period, for example, such that each line (e.g., rows or columns) of display pixels is successively written for a scan duration (e.g., line time). After the refresh period, the electronic display may continue displaying the image during a (e.g., vertical) blanking period, for example, until the next refresh period begins. In other words, display duration of an image may be divided into a refresh period and a blanking period.

Although processing duration may vary slightly (e.g., due to image content), duration between successive image data processing periods of the display pipeline is generally (e.g., approximately) equal to duration between successive refresh periods and, thus, is also referred to herein as a (e.g., vertical) blanking period. To enable processing image data during an image data processing period, the display pipeline may be programmed with a target display pipeline configuration during a programming period directly before the image data processing period. In other words, duration of the programing period may be less than or equal to the blanking period and, thus, act as a lower bound on duration of the blanking period.

However, at least in some instances, reducing the duration of blanking periods may facilitate improving perceived image quality. For example, reducing the duration of blanking periods may enable an electronic display to implement higher (e.g., greater than 60 Hz) refresh rates. Additionally or alternatively, reducing the duration of blanking periods may enable an electronic display to increase duration of its refresh periods. In some instances, increasing duration of refresh periods may facilitate compatibility with a higher (e.g., $2k$ or $4k$) resolution electronic display. Additionally or alternatively, increasing duration of refresh periods may enable increasing line time used to write (e.g., refresh) each line (e.g., row or column) of display pixels, which, at least in some instances, may facilitate improving perceived image quality.

For example, a display pixel in an organic light emitting diode (OLED) electronic display may include a pixel capacitor and an OLED. In particular, electrical energy (e.g., voltage) stored in the pixel capacitor may control current flow through the OLED and, thus, light emission from the display pixel. Since charging and/or discharging of a pixel capacitor is generally non-instantaneous, at least in some instances, increasing line time may facilitate reducing likelihood that the pixel capacitor is insufficiently charged or discharged and, thus, likelihood that the OLED) electronic display displays a perceivable visual artifact.

As such, the present disclosure provides techniques for implementing and/or operating a configuration buffer in a display pipeline, for example, to facilitate improving perceived image quality when image data output from the display pipeline is used to display a corresponding image. In some embodiments, a configuration buffer may be implemented with multiple partitions, which each stores configuration entries (e.g., address and configuration data) corresponding with a different portion of the display pipeline. For example, a first configuration buffer partition may store configuration entries corresponding with a first group of one or more image data processing blocks implemented in the display pipeline while a second configuration buffer partition stores configuration entries corresponding with a second group of one or more image data processing blocks implemented in the display pipeline.

Additionally, in some embodiments, implementing multiple configuration buffer partitions may enable a display pipeline to program different portions of its image data processing circuitry in parallel. For example, during the same clock cycle, the first configuration buffer partition may output a first configuration entry, which identifies a first image data processing block and includes first configuration data, and the second configuration buffer partition may output a second configuration entry, which identifies a second image data processing block and includes second configuration data. Based on the output configuration entries, the display pipeline may program the first image data processing block and the second image data processing block in parallel, for example, by storing the first configuration data in a first programmable register of the first image data processing block and storing the second configuration data in a second programmable register of the second image data processing block.

In this manner, a configuration buffer implemented with multiple partitions may facilitate reducing minimum duration sufficient to program a display pipeline configuration, for example, compared to a non-partitioned configuration buffer that outputs a single configuration entry per clock cycle, thereby resulting in the display pipeline serially programming its image data processing blocks. In other words, implementing a partitioned configuration buffer may facilitate reducing duration of programming periods implemented by the display pipeline and, thus, duration of blanking periods. However, in some embodiments, reduction to the duration of programming periods may vary with implementation of the partitioned configuration buffer, for example, due the programming duration sufficient for the slowest configuration buffer partition acting as a lower bound.

Thus, in some embodiments, implementation of a partitioned configuration buffer may be designed to balance programming duration sufficient for each of its configuration buffer partitions to program an associated portion of the display pipeline, for example, such that each configuration buffer partition reaches an end marker at approximately the same time (e.g., within one or two clock cycles). To facilitate balancing the configuration buffer partitions, in some embodiments, implementation of the display pipeline may be analyzed, for example, to determine number and/or location (e.g., address) of programmable registers implemented in its image data processing blocks, operational interrelationship between image data processing blocks, and/or physical relationship between image data processing blocks.

Based at least in part on the analysis of display pipeline, image data processing blocks may be grouped such that each configuration buffer partition associated with a group of image data processing blocks is expected to store approximately the same number of configuration entries, which, at least in some instance, may facilitate further reducing duration of programming periods implemented by the display pipeline and, thus, duration of blanking periods. In any case, as described above, reducing duration of blanking periods, at least in some instances, may facilitate improving perceived image quality, for example, by enabling refresh rate to be increased, duration of refresh periods to be increased (e.g., to facilitate compatibility with higher resolution electronic displays), and/or duration of line time to be increased.

To facilitate improving power consumption efficiency, in some embodiments, an electronic device may power gate its display pipeline when the display pipeline is idle, for example, by electrically disconnecting a power source from the display pipeline. Generally, a display pipeline may be active while the display pipeline is programming its image data processing circuitry and while the display pipeline is processing image data. On the other hand, the display pipeline may be idle when the display pipeline is not programming its image data processing and not processing image data, which generally occurs during blanking periods.

As such, in some embodiments, a blanking period may include an idle (e.g., power gate) period in addition to a programming period. In other words, although a partitioned configuration buffer may enable reducing duration of a blanking period, in some embodiments, duration of the blanking period may nevertheless be greater (e.g., longer) than the programming period, for example, to accommodate a non-overlapping power gate period during the blanking period. As described above, implementing a partitioned configuration buffer may enable programming periods implemented by the display pipeline to be reduced. Accordingly, in some embodiments, implementing a partitioned configuration buffer may enable duration of power gate periods to be increased, which, at least in some instances, may facilitate reducing power consumption of a display pipeline and, thus, improving power consumption efficiency of an electronic device in which the display pipeline is implemented.

With the foregoing in mind, an electronic device 10, which includes an electronic display 12, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, memory 20 that may be local to the device 10, a main memory storage device 22, a network interface 24, a power supply 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the main memory storage device 22 may be included in a single component. Additionally, the image processing circuitry 27 (e.g., a graphics processing unit (GPU)) may be included in the processor core complex 18.

As depicted, the processor core complex 18 is operably coupled with memory 20 and the main memory storage device 22. In some embodiments, the memory 20 and/or the main memory storage device 22 may be one or more tangible, non-transitory, computer-readable media that stores instructions executable by the processor core complex 18 and/or data to be processed by the processor core complex 18. For example, the memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instructions stored in memory 20 and/or the main memory storage device 22 to perform operations, such as generating image data and/or determining configuration data to be used to program a display pipeline configuration for processing the image data. As such, the processor core complex 18 may include one or more general purpose microprocessors, one or more application specific processors (ASICs), one or more field programmable logic arrays (FPGAs), or any combination thereof.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image data to the portable storage device and/or receive image data from the portable storage device.

As depicted, the processor core complex 18 is also operably coupled to the power supply 26, which may provide power to the various components in the electronic device 10. The power supply 26 may include any suitable source of energy, such as a rechargeable lithium polymer (Li-poly) battery and/or an alternating current (AC) power converter. Furthermore, as depicted, the processor core complex 18 is operably coupled with input devices 14, which may enable a user to interact with the electronic device 10. In some embodiments, the inputs devices 14 may include buttons, keyboards, mice, trackpads, and the like. Additionally or alternatively, the electronic display 12 may include touch components that enable user inputs to the electronic device 10 by detecting occurrence and/or position of an object touching its screen (e.g., surface of the electronic display 12).

In addition to enabling user inputs, the electronic display 12 may facilitate providing visual representations of information by displaying images (e.g., in one or more image frames). For example, the electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control luminance of one color component (e.g., red, blue, or green).

As described above, the electronic display 12 may display an image by controlling luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 27, for example, implemented as a display pipeline.

Figure 2:
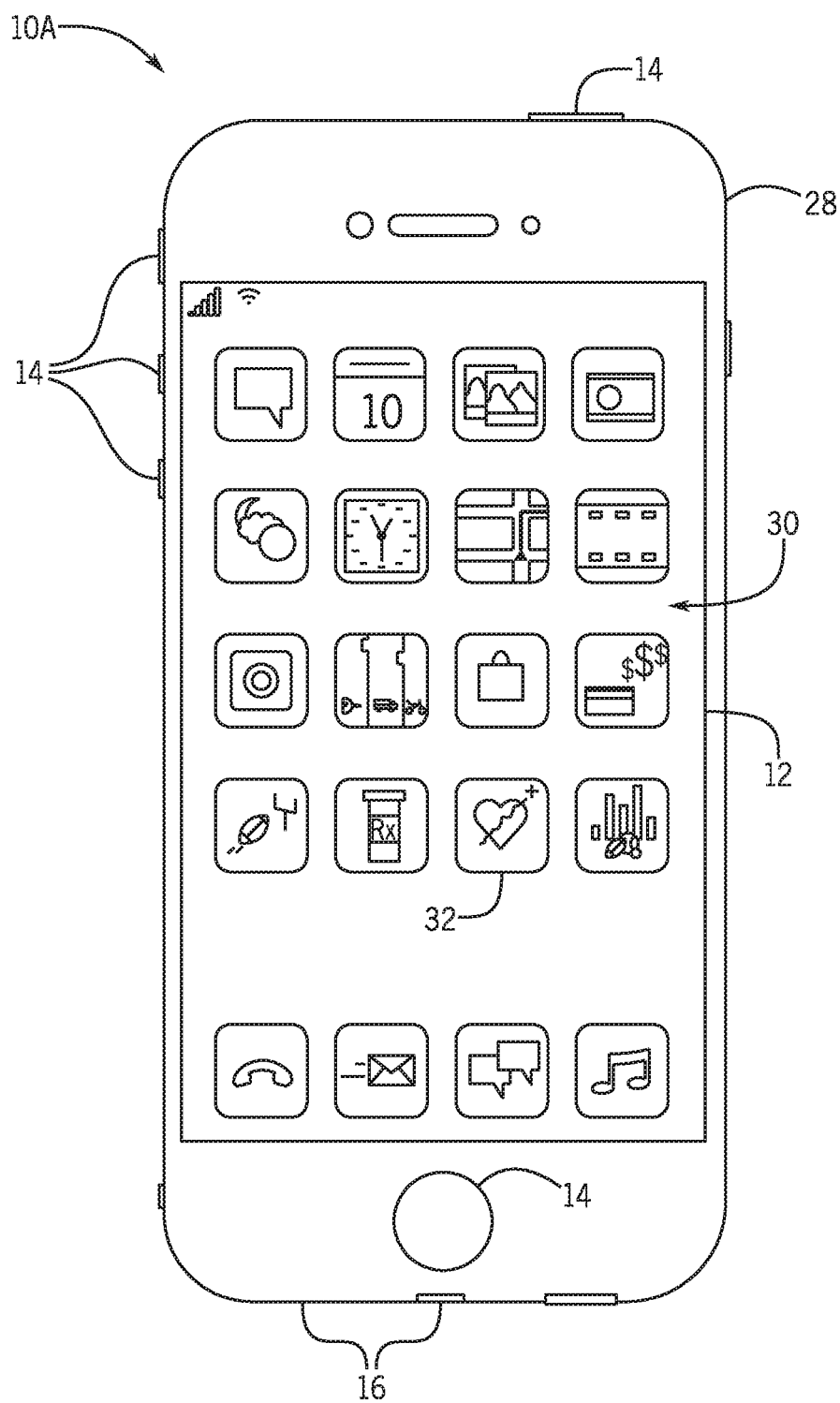
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
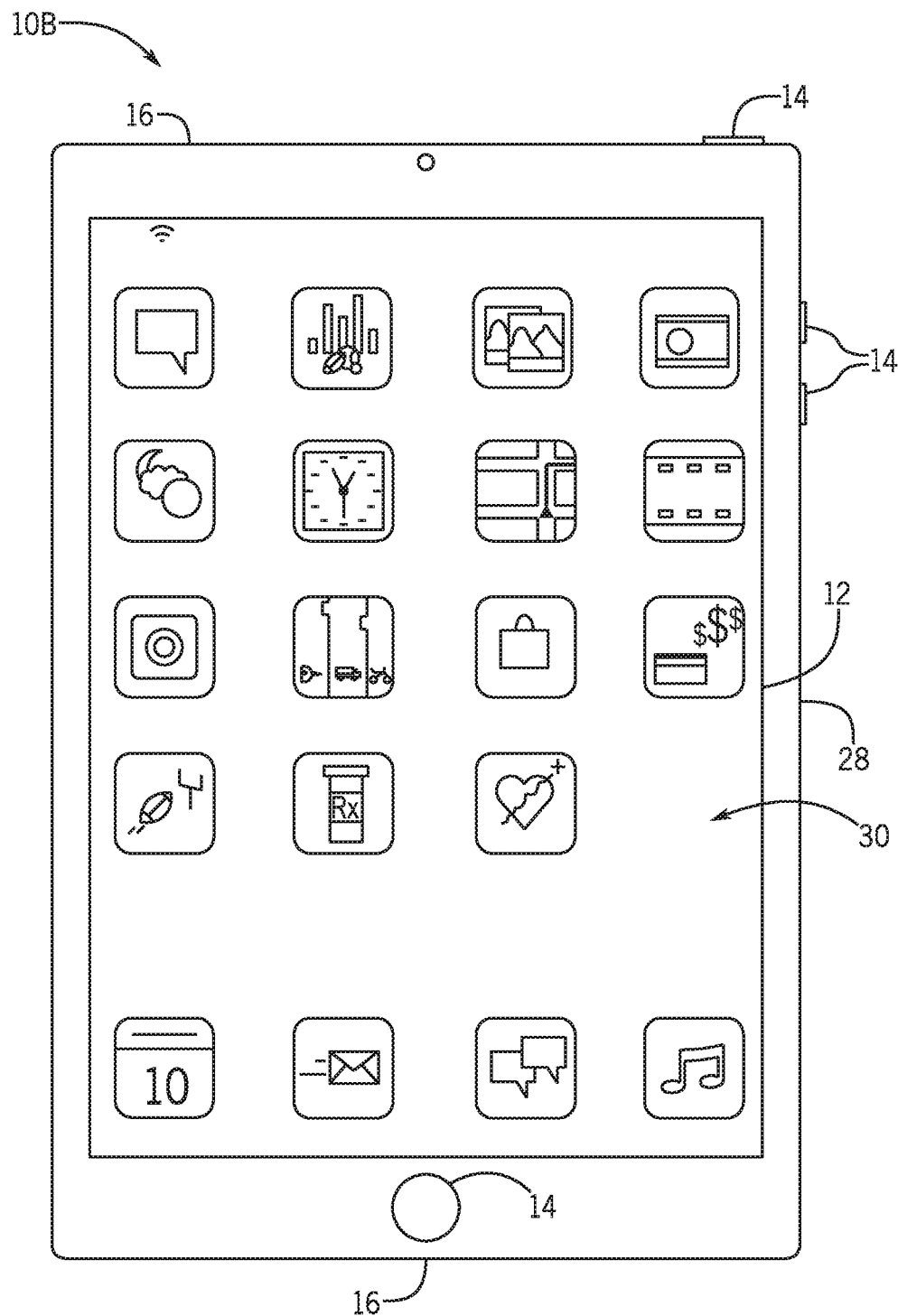
FIG. 3 is another example of the electronic device of FIG. 1, in accordance with an embodiment.
Figure 4:
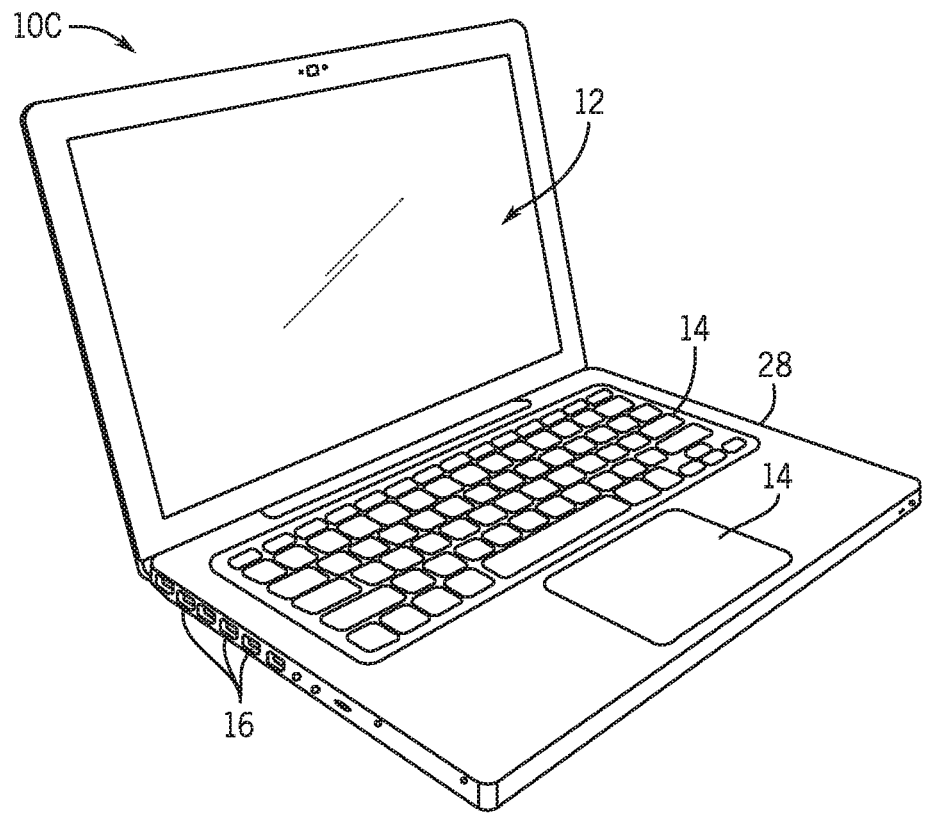
FIG. 4 is another example of the electronic device of FIG. 1, in accordance with an embodiment.
Figure 5:
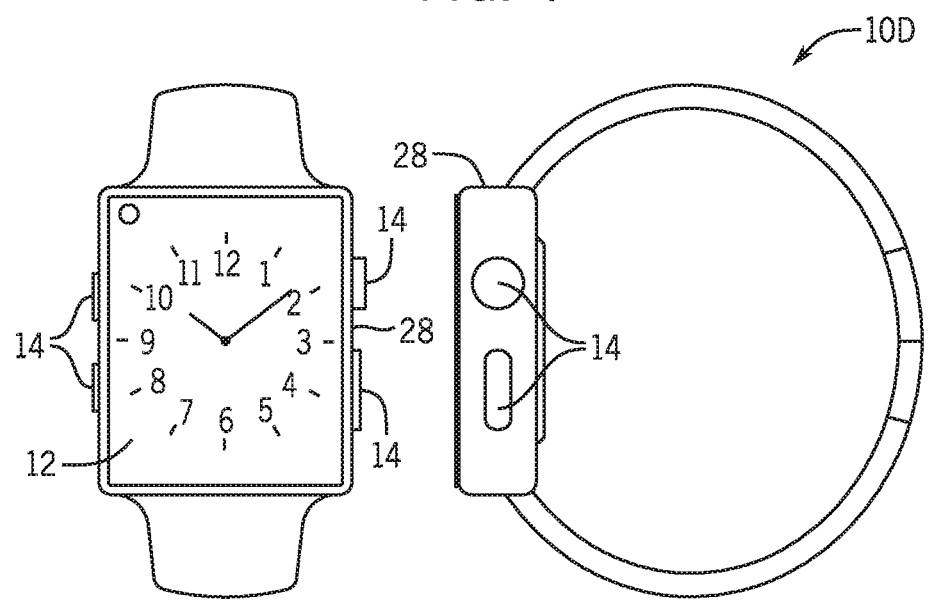
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, an electronic display 12 may display images based at least in part on the image data, for example, received from the local memory 20 and/or the main memory storage device 22. Additionally, as described above, image data may be processed before being used to display a corresponding image on the electronic display 12, for example, to facilitate improving perceived image quality. In some embodiments, image data may be fetched and processed by a display pipeline implemented in the electronic device 10.

Figure 6:
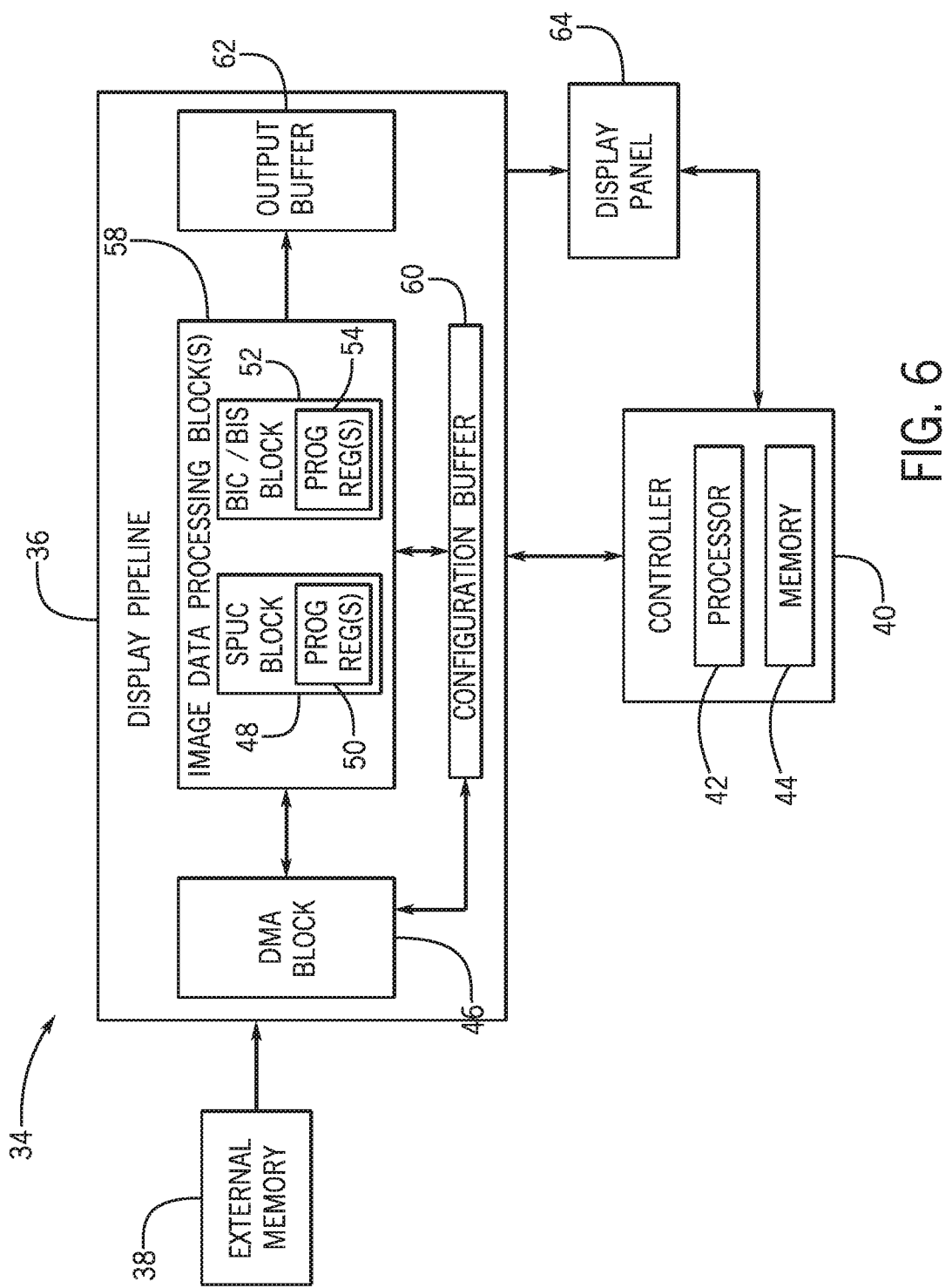
FIG. 6 is a block diagram of a portion of the electronic device of FIG. 1 including a display pipeline with a configuration buffer, in accordance with an embodiment.

To help illustrate, a portion 34 of the electronic device 10, which includes a display pipeline 36 with a configuration buffer 60, is shown in FIG. 6. The portion 34 may also include external memory 38 (e.g., memory storage device 22) and a controller 40. The external memory 38 may hold image data and/or configuration data to be included in configuration entries of the configuration buffer 60. In some embodiments, the controller 40 may control operations of the display pipeline 36, the external memory 38, and/or the display panel 64. For example, the controller 40 may be a direct memory access (DMA) controller that coordinates access to external memory 38 by the display pipeline 36 based on indications (e.g., signals) that the image data is to be stored in external memory 38 and/or indications that image data is to be retrieved from external memory 38 for processing. As an additional example, the controller 40 may interface with the display panel 64 to determine the initiation of the line-time of each display pixel line.

To facilitate controlling operations, the controller 40 may include a controller processor 42 and controller memory 44. In some embodiments, the controller processor 42 may execute instructions stored in the controller memory 44. Thus, in some embodiments, the controller processor 42 may be included in the processor core complex 18, the image processing circuitry 27, a timing controller in the electronic display 12, a separate processing module, or any combination thereof. Additionally or alternatively, the controller memory 44 may be included in local memory 20, the main memory storage device 22, external memory 38, internal memory of a display pipeline 36, a separate tangible, non-transitory, computer readable medium, or any combination thereof. Although depicted as a single controller 40, in some embodiments, one or more separate controllers 40 may be implemented to control operation of the display pipeline 36, for example, by coordinating access to image data in external memory 38.

In some embodiments, the display pipeline 36 may be included in the processor core complex 18, the image processing circuitry 27, a timing controller (TCON) in the electronic display 12, other one or more processing units, other processing circuitry, or any combination thereof. Additionally or alternatively, the display pipeline 36 may be implemented via circuitry, for example, packaged as a system-on-chip (SoC). Further, it should be appreciated that the electronic device 10 and/or electronic display 12 may have one or more display pipelines 36.

As depicted, the display pipeline 36 includes a direct memory access (DMA) block 46 that may provide the display pipeline 36 access to the external memory 38. For example, the DMA block 46 may retrieve (e.g., read) image data from external memory 38 for processing by the image data processing block(s) 58. Additionally or alternatively, the DMA block 46 may store (e.g., write) processed image data in external memory 38.

The display pipeline 36 may also include one or more image data processing blocks 58, such as a sub-pixel uniformity compensation (SPUC) block 48. In some embodiments, depending on a pipeline configuration associated with an image, the SPUC block 48 may apply a voltage offset to each sub-pixel to compensate for voltage non-uniformity resulting from manufacturing tolerances of electrical components. For example, common electrodes in an electronic display 12 may exhibit different resistance values creating a patterned voltage imbalance that may appear as visible artifacts, such as muras. The voltage offset compensates, for example, for the voltage imbalance arising from manufacturing tolerances. The SPUC block 48 may include one or more programmable registers 50 that may store configuration data output from the configuration buffer 60.

Furthermore, the display pipeline 36 may include a burn-in compensation (BIC)/burn-in statistics (BIS) block 52 that processes image data according to a desired configuration. The BIC portion of the block 52 may monitor luminance history of the display 12 and/or apply a computed gain to compensate for burn-in effects. For example, the BIC portion of the block 52 may apply a gain to the sub-pixel values (e.g., image data values) such that the pixels appear to age uniformly, thereby accounting for global brightness and uniformity of a frame of image data. Additionally, the BIS portion of the block 52 may periodically compute an update to the sub-pixel luminance history. Based on the history, the BIS portion may model the aging of individual sub-pixels. In particular, the computation may factor in the display 12 temperature, which may vary across the display 12 due to, for example, the presence of components such as an image signal processor (ISP), camera sensor, and the like at various positions behind the display 12. The computation may also factor the luminance output over time for an individual sub-pixel. The BIC/BIS block 52 may include one or more programmable registers 54 that may store configuration entries associated with a desired configuration and transmitted by the configuration buffer 60.

The image data processing block(s) 58 (e.g., SPUC, BIC/BIS) may together process the image data to account for parameters of a source image, parameters of the display panel 64, and/or environmental conditions. It should be appreciated that the image data processing block(s) 58 may include additional process blocks such as ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content frame dependent duration (CDFD) block, an ambient light sensing (ALS) block, or any combination thereof. Future references to image data processing block(s) 58 may include processing blocks that may use a portion of the total memory bandwidth.

The configuration entries may indicate (e.g., signals) how the image processing block(s) 58 should process the image data and may be stored in the configuration buffer 60 of the display pipeline 36. The configuration buffer 60, such as a shadow first-in-first-out (FIFO) buffer, may hold configuration information that may change between image frames for all programmable register(s) 50, 54 in the display pipeline 36. That is, the configuration buffer 60 may queue configuration entries for potentially multiple image frames in advance. During the blanking period, the display pipeline 36 may load the programmable register(s) 50, 54 of the image data processing block(s) 58 with the configuration entries stored in the configuration buffer 60, thereby enabling the display pipeline 36 to implement different pipeline configurations for different image frames. For example, a configuration for an image frame may include media tile with color format YCbCr10 and a rotation.

In some instances, the configuration buffer 60 may be a shadow FIFO buffer. FIFOs are memory buffers that may behave elastically between synchronous and asynchronous systems by storing data (e.g., queued configuration entries) as received and outputting the data to a system (e.g., image data processing block(s) 58) on a first-in-first-out basis. A shadow FIFO buffer operates according to the first-in-first-out principal and contains one or more shadow registers. Shadow registers are used to reduce register load and/or store overhead when invoked (e.g., requested during a handling interrupt) as they may serve as a copy of general purpose registers. For example, a FIFO interrupt may request loading of data in a shadow register to the programmable register 50. In such instances, the data may be provided directly to the programmable register 50 without any RAM cycles (e.g., memory bus requests). Although the configuration buffer 60 has been mentioned to be a shadow FIFO buffer, it should be appreciated that the configuration buffer 60 may be any memory buffer that may store configuration entries.

Once the image data has been processed by the image data processing block(s) 58 according to the configuration entries output from the configuration buffer 60, the processed image data may be temporarily stored in an output buffer 62, for example, before retrieval by a display panel 64 of the electronic device 12. The output buffer 62 may act as a reservoir for processed image data, storing multiple image frames at any given time. As such, the output buffer 62 may reduce likelihood of perceivable lag in displaying a new image on the electronic. Further, the display panel 64 may be a semiconductor integrated device that functions as an interface between, for example, the display pipeline 36 and the display 12 and may be used to drive each pixel display line in an allotted amount of time.

In some instances, the configuration buffer 60 may be implemented to serially load the programmable register(s) 50, 54 with configuration entries corresponding to one image frame. Serial transmission, however, may be relatively slow and because the transmission of configuration entries only occurs during the blanking, the duration of the blanking period may increase to ensure complete transmission of configuration entries corresponding to an image frame. To compensate, the line-time duration may decrease and thus, so may the display pixel driving time.

As described above, the electronic device 10 may include an electronic display 12 that using display technology that benefits from longer pixel drive times. For example, in some embodiments, the electronic display 12 may be an LCD display while, in other embodiments, the display may be an OLED display, such as an AMOLED display or a PMOLED display. Although operation may vary, some operational principles of different types of electronic displays 12 may be similar. For example, an electronic display 12 may generally display image frames by controlling luminance of their display pixels based on the processed image data.

Figure 7:
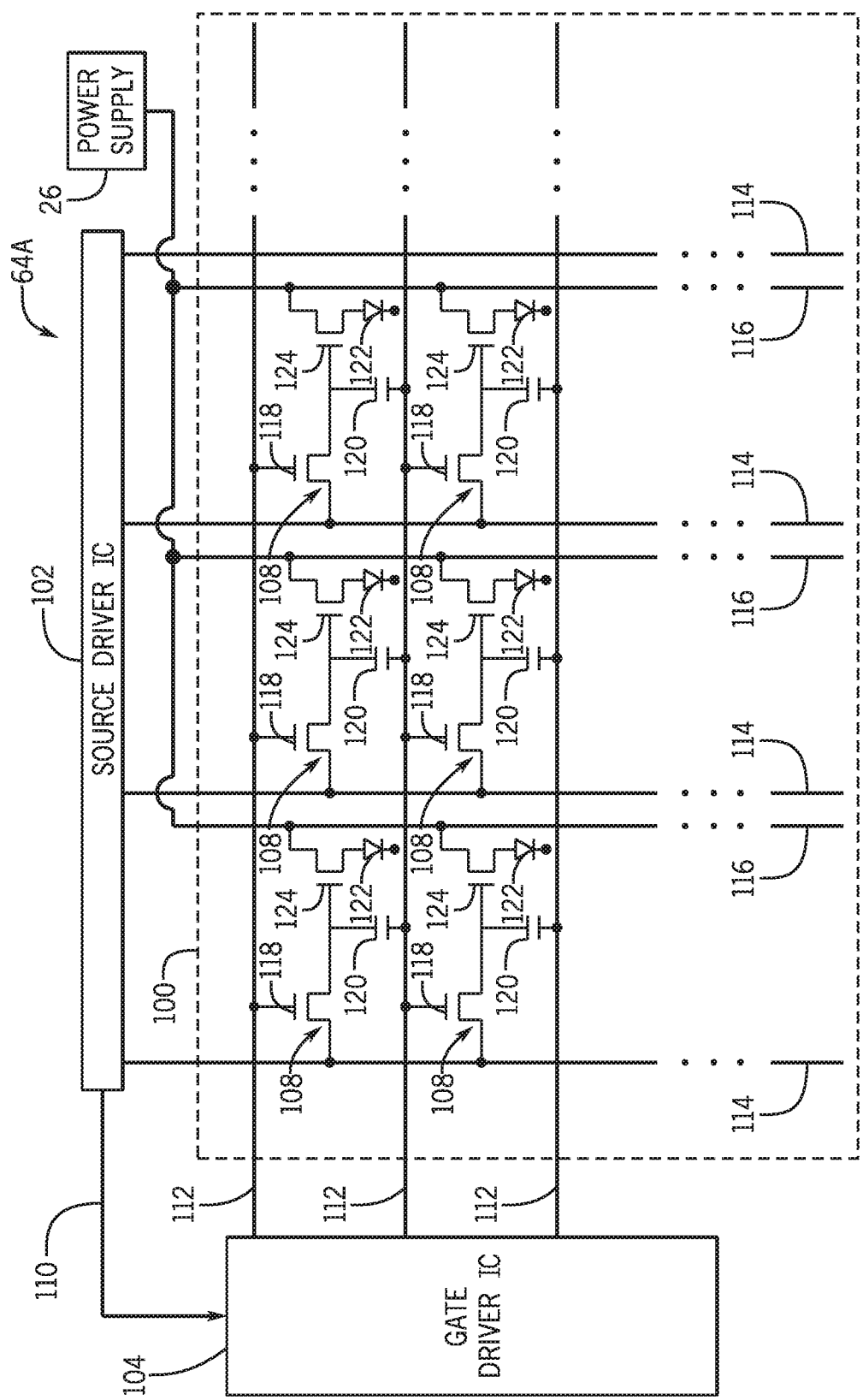
FIG. 7 is a block diagram of an organic light emitting diode (OLED) electronic display, in accordance with an embodiment.

To help illustrate, an example of a display panel 64, which may be implemented in an electronic display 12, is shown in FIG. 7. As depicted, the display panel 64A includes a pixel array 100, a source driver 102, a gate driver 104, and a power supply 106. In particular, the pixel array 100 may include multiple display pixels 108 arranged as an array or matrix defining multiple rows and columns. For example, the depicted embodiment includes six display pixels 108. It should be appreciated that although only six display pixels 108 are depicted, in an actual implementation the pixel array 100 may include hundreds or even thousands of display pixels 108.

As described above, an electronic display 12 may display image frames by controlling luminance of its display pixels 108 based at least in part on processed image data received via the display panel 64. To facilitate displaying an image frame, a timing controller may determine and transmit timing data 110 to the gate driver 104 based at least in part on the processed image data. For example, in the depicted embodiment, the timing controller may be included in the source driver 102. Accordingly, in such embodiments, the source driver 102 may receive the processed image data that indicates desired luminance of one or more display pixels 108 for displaying the image frame, analyze the processed image data to determine the timing data 110, and transmit the timing data 110 to the gate driver 104. Based at least in part on the timing data 110, the gate driver 104 may then transmit gate activation signals to activate a row of display pixels 108 via a gate line 112.

When activated, luminance of a display pixel 108 may be adjusted by processed image data received via data lines 114. In some embodiments, the source driver 102 may generate the image by receiving a voltage corresponding to a processed image data. The source driver 102 may then supply the processed image data to the activated display pixels 108. Thus, as depicted, each display pixel 108 may be located at an intersection of a gate line 112 (e.g., scan line) and a data line 114 (e.g., source line). Based on received image data, the display pixel 108 may adjust its luminance using electrical power supplied from the power supply 106 via power supply lines 116.

Each display pixel 108 may include a circuit switching thin-film transistor (TFT) 118, a storage capacitor 120, an OLED 122, and a driving TFT 124 whereby each of the storage capacitors 120 and the OLED 122 are coupled to a common voltage, VCOM. To facilitate adjusting luminance, the driving TFT 124 and the circuit switching TFT 118 may each serve as a switching device that is controllably turned on and off by voltage applied to the respective gate. In the depicted embodiment, the gate of the circuit switching TFT 118 is electrically coupled to a gate line 112. Accordingly, when a gate activation signal received from its gate line 112 is above its threshold voltage, the circuit switching TFT 118 may turn on, thereby activating the display pixel 108 and charging the storage capacitor 120 with the processed image data received at its data line 112.

Additionally, in the depicted embodiment, the gate of the driving TFT 124 is electrically coupled to the storage capacitor 120. As such, voltage of the storage capacitor 120 may control operation of the driving TFT 124. More specifically, in some embodiments, the driving TFT 124 may be operated in an active region to control magnitude of supply current flowing from the power supply line 116 through the OLED 122. In other words, as gate voltage (e.g., storage capacitor 120 voltage) increases above its threshold voltage, the driving TFT 124 may increase the amount of its channel available to conduct electrical power, thereby increasing supply current flowing to the OLED 122.

On the other hand, as the gate voltage decreases while still being above its threshold voltage, the driving TFT 124 may decrease amount of its channel available to conduct electrical power, thereby decreasing supply current flowing to the OLED 122. In this manner, the display panel 64A may control luminance of the display pixel 108. Because of how OLED display technology drives the display pixels 108 (e.g., push the circuit switching TFT 118 into the active region, charge the storage capacitor 120, and drive the driving TFT 124), OLED displays 12A may be particularly susceptible to duration of the blanking duration since the storage capacitors of OLED pixels 108 may use a longer period of time to adequately charge and emit. That is, OLED pixel 108 driving time and thus, line-time, may be longer than, for example, driving time of other display technologies and/or driving time available based on display 12 operating parameters. Although OLED technology was described in detail above, any display technology whose display pixel yield may be affected by duration of the blanking period may be included.

Figure 8:
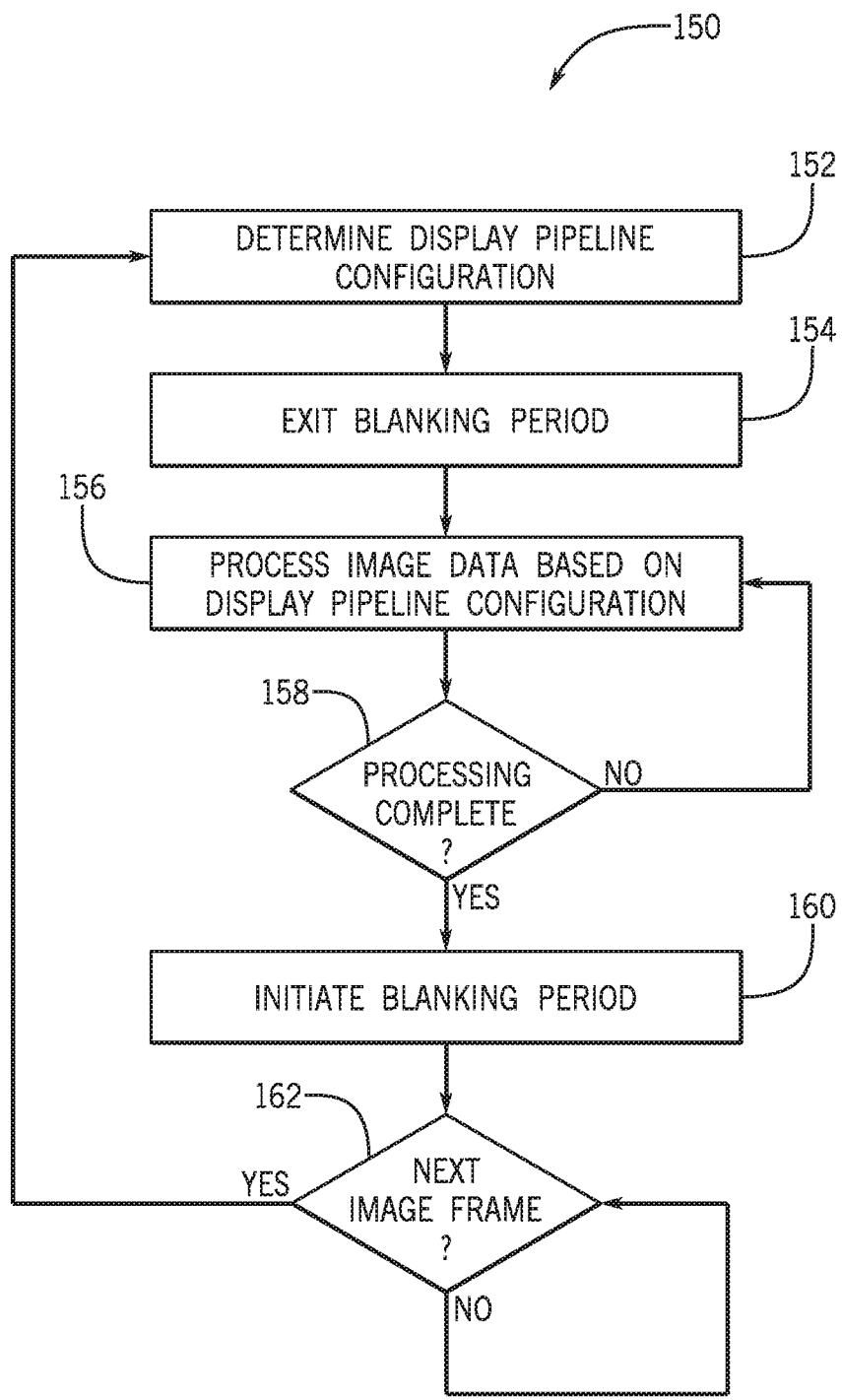
FIG. 8 is a flow diagram of a process for operating the display pipeline of FIG. 6, in accordance with an embodiment.

Accordingly, FIG. 8 describes a process 150 for timing the blanking period in relation to operations (e.g., image processing, image data frame transmission) of the display pipeline 36. Generally, the process 150 includes determining display pipeline configuration corresponding to an image frame (process block 152), exiting the blanking period (process block 154), processing image data based on the display pipeline configuration (i.e., configuration entries) (process block 156), determining whether processing of image data belonging to an image frame is complete (decision block 158), initiating the blanking period when processing is complete (process block 160), and when a next image frame is available, repeating process 150 (decision block 162). While the process 150 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 150 may be implemented at least in part by a processor core complex 18 that executes instructions stored in a tangible, non-transitory, computer-readable medium, such as the memory 22. In alternative or additional embodiments, at least some steps of the process 150 may be implemented by any other suitable components or control logic, such as another electronic device, and the like.

Figure 9:
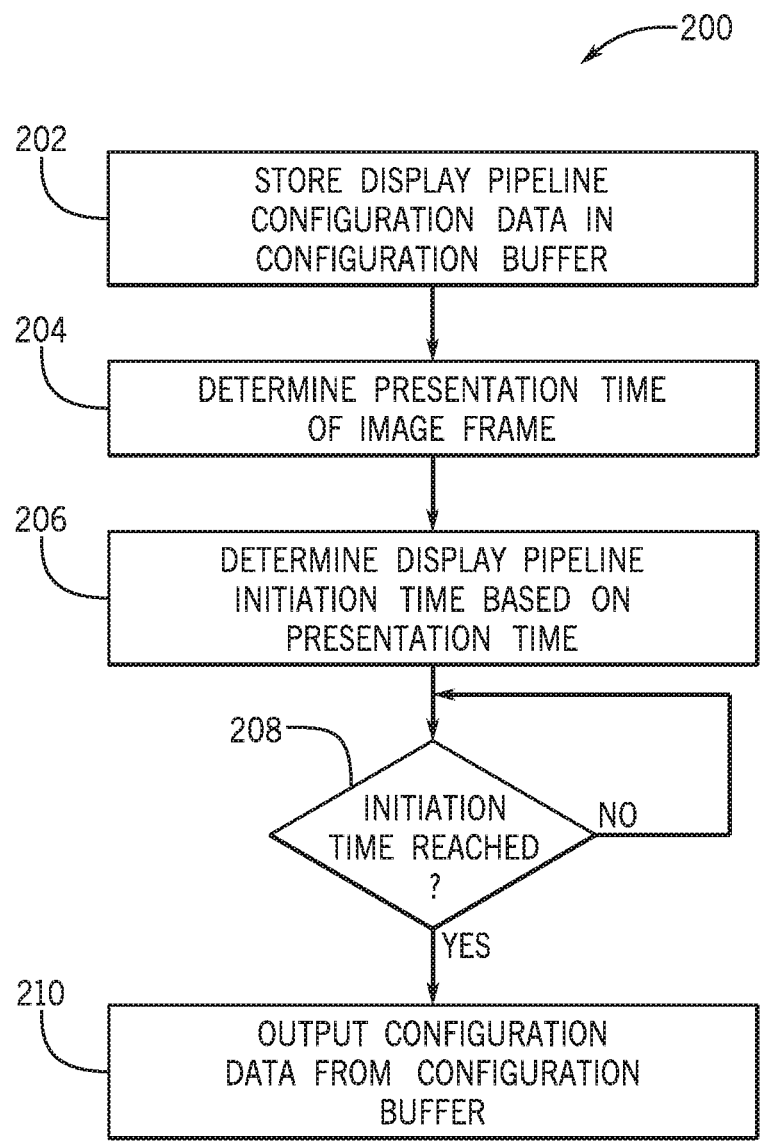
FIG. 9 is a flow diagram of a process for operating the configuration buffer of FIG. 6, in accordance with an embodiment.

Accordingly, in some embodiments, a controller 40 may determine a pipeline configuration to be implemented in a display pipeline 36 (process block 152). To help illustrate, an example of a process 200 for determining and timing the output of a display pipeline configuration associated with an image frame is described in FIG. 9. Generally, the process 200 includes storing display pipeline configuration data in the configuration buffer 60 (process block 202), determining presentation time of the image frame (process block 204), determining the display pipeline initiation time based on presentation time (process block 206), evaluating whether the initiation time has been reached (decision block 208), and outputting the configuration entry from the configuration buffer 60 via, for example, shadow registers to the programmable register(s) 50, 54 (process block 210). While the process 200 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 200 may be implemented at least in part by a processor core complex 18 that executes instructions stored in a tangible, non-transitory, computer-readable medium, such as the memory 22. In alternative or additional embodiments, at least some steps of the process 200 may be implemented by any other suitable components or control logic, such as another electronic device, and the like.

Thus, in some embodiments, the controller 40 may instruct the DMA block 46 to retrieve the display pipeline configuration data associated with an image frame from the external memory 38 and store the configuration data in the configuration buffer 60 (process block 202). The display pipeline configuration data may be determined based on configuration data stored in, for example, external memory 38 and may be based on properties of the image frame, such as rotation and the color format source, and may change between image frames. The display pipeline configuration data may be stored in the registers of the configuration buffer 60 including, for example, shadow registers.

In some embodiments, upon storing the display pipeline configuration data, the target presentation time of the image frame may be determined (process block 204). The presentation time may refer to the time at which the image frame may be presented to the display 12 for display. In other words, for OLEDs, the presentation time may refer to the time at which the storage capacitor 120 begins charging and therefore, the pixels 108 emitting light. Further, the presentation time may occur after the blanking period since the incoming image frame may not be displayed on the screen (e.g., no gate activation signal, no incoming image frame from the output buffer 62).

In some embodiments, the controller 40 may also determine a display pipeline initiation time based on the presentation time (process block 206). The initiation time may refer to the time at which the display pipeline 36 resumes operations, such as image processing, after the blanking period. Determination of the initiation time may factor the time for performing display pipeline operations on the image data according to the display pipeline configuration.

In some embodiments, the controller 40 may determine whether the initiation time has been reached (decision block 208). When the initiation time has not been reached, the process 200 may continuously loop until the time is reached. In the event that the initiation time is reached, the configuration buffer 60 may output one or more configuration entries to the programmable register(s) 50, 54 of the display pipeline 36, via, for example, the shadow registers (process block 210). The configuration entries may include the display pipeline configuration data and will be discussed in more detail below.

Returning to process 150 of FIG. 8, the display pipeline 36 may exit the blanking period after determining the display pipeline configuration (process block 154). Upon exiting the blanking period, the display pipeline 36 may begin processing image data based on the display pipeline configuration data of the configuration entries (process block 156). For example, the image data processing block(s) 58 may process the image data based on the display pipeline configuration stored within their respective programmable register(s) 50, 54. The controller 40 may then determine whether the processing of the image data associated with the display pipeline configuration data is complete (decision block 158). Once the processing of the image data is complete, the blanking period may be reinitiated (process block 160). In some embodiments, during the blanking period, the controller 40 may determine whether a next single or series of image frames are available (decision block 162). Upon determination that subsequent image frame(s) exist, image data associated with the next one or series of image frames may be retrieved, for example, via the DMA block 46 from external memory 38 and the appropriate display pipeline configuration may be determined.

Figure 10:
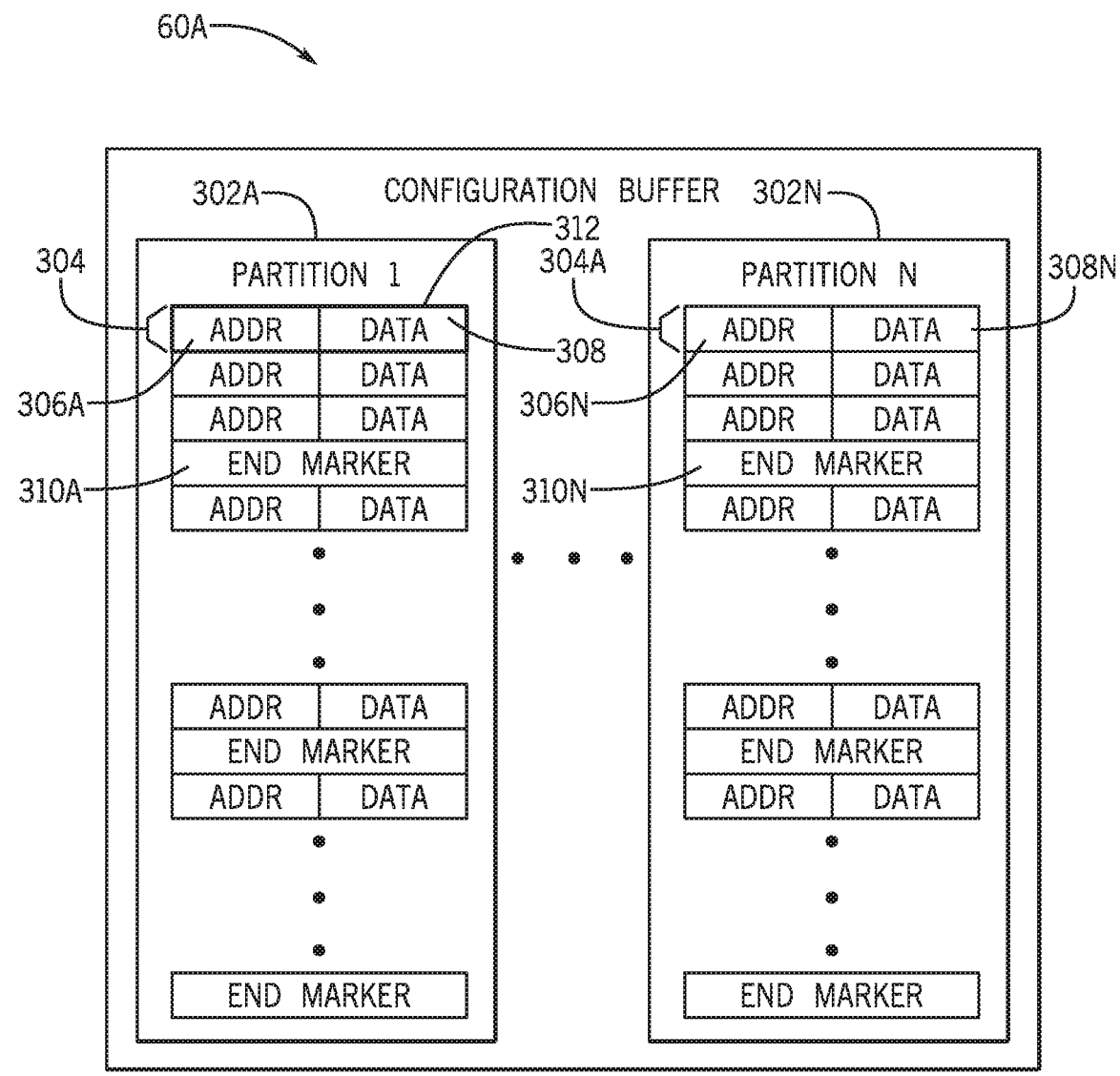
FIG. 10 is a diagrammatic representation of the configuration buffer of FIG. 6 implemented as a partitioned configuration buffer, in accordance with an embodiment.

The display pipeline configuration may be stored in a single configuration buffer 60 or in a partitioned configuration buffer 60A as shown in FIG. 10. The partitioned configuration buffer 60A may effectively function as multiple linked configuration buffers 60, which may facilitate reducing the blanking period and, thus, potentially improving perceived image quality (e.g., pixel yield of the display panel). Specifically, each partition 302A-302N of the configuration buffer 60A may be associated with a portion of the display pipeline 36 (e.g., one or more image data processing blocks 58) and may each be responsible for loading configuration entries (including display pipeline configuration data) into the programmable register(s) 50, 54 of a portion of the display pipeline 36. For example, a first partition 302A may be associated with the SPUC block 48 and may load configuration entries sent from the configuration buffer 60 into the corresponding programmable register(s) 50 while an Nth partition 302N may be associated with the BIC/BIS block 52 and may load configuration entries into the corresponding programmable register(s) 54.

In this manner, each partition 302 may program its associated programmable register(s) 50, 54 of the display pipeline 36 substantially simultaneously. Because multiple portions of the display pipeline 36 may be programmed at once rather than serially, the duration for the blanking period may be reduced. Specifically, during the blanking period, configuration entries for an image frame is determined and/or stored as described in process block 152 and in process 200. By simultaneously loading the configuration entries in different portions of the display pipeline 36, the amount of time taken to carry out the operation(s) may be reduced as may the blanking period.

Each portion 302 of the configuration buffer 60 may include one or more configuration registers 304 (e.g., shadow registers). Each configuration register 304 may store information relating to the address 306 of the corresponding programmable register(s) 50, 54 that the configuration register 304 may load the configuration entries into. Further, the configuration register 304 may hold the display pipeline configuration data 308, which may be used to control the processing of image data. For example, the display pipeline configuration data 308 may include information on the desired color format for an image frame and/or a memory address the may be used by the DMA block 46 to fetch the image data. A configuration entry 312 may include the programmable register address 306 and the display pipeline configuration data 308.

Once the initiation time has been reached, controller 40 may instruct the display pipeline 36 to output (e.g., drain) the configuration entries 312 from the configuration buffer 60A to the corresponding programmable register(s) 50, 54 (process block 210). In some embodiments, the configuration entries 312 are drained until an end marker entry 310 is reached. If no end marker entry 310 is available, then the display pipeline configuration is not updated (i.e., the configuration entry 312 is not drained). The end marker entry 310 may be used to indicate completion of a frame configuration, enabling a FIFO like behavior of the configuration buffer 60. It should be appreciated that the configuration buffer 60A may have any number of partitions 302, configuration registers 304, and end markers 310.

The partitions 302 may be created by physically dividing the configuration buffer 60 into sections. Alternatively or additionally, the configuration buffer may be partitioned using software that isolates portions of the buffer 60A, for example, by using header indications.

Figure 11:
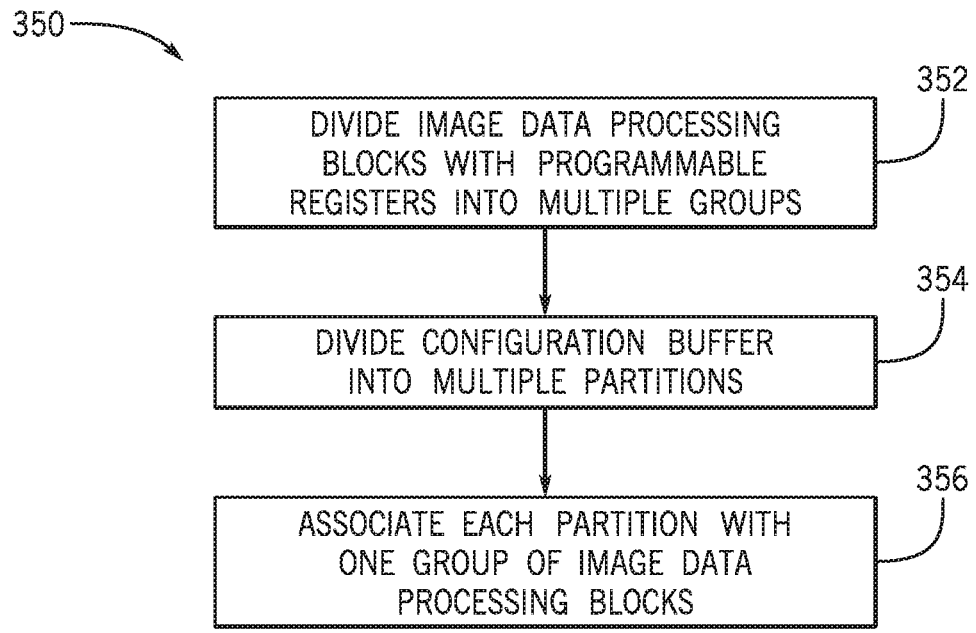
FIG. 11 is a flow diagram of a process for implementing the partitioned configuration buffer of FIG. 10, in accordance with an embodiment.

In any case, an example of a process 350 for determining designing implementation of a configuration buffer 60 is described in FIG. 11. Generally, process 350 includes dividing the image data processing block(s) 58 into multiple groups (process block 352), dividing the configuration buffer 60A into multiple partitions 302 (process block 354), and associating each partition 302 with one group of image data processing block(s) 58 (process block 356). While the process 350 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 350 may be implemented at least in part by a processor core complex 18 that executes instructions stored in a tangible, non-transitory, computer-readable medium, such as the memory 22. In alternative or additional embodiments, at least some steps of the process 350 may be implemented by any other suitable components or control logic, such as another electronic device, and the like.

Thus, in some embodiments, the image data processing block(s) 58 that include programmable register(s) 50, 54 may be divided into multiple groups (process block 352). The image data processing block(s) 58 may be grouped together based on their functionality. For example, the SPUC block 48 and the BIC/BIS block 52 may be grouped together such that the first portion 302 of the configuration buffer 60A may load the register(s) 50, 54 of these blocks after initiation time has been reached.

Further, the configuration buffer 60A may be divided into multiple partitions (process block 354). As mentioned above, the partitions 302 may be formed by physically dividing the configuration buffer 60A, dividing by software, and/or dividing by hardware. The partition sizes may be determined by comparing the size of the configuration buffer 60 to the display pipeline 36 (e.g., number of display pipeline registers). For example, an image processing block (e.g., the SPUC Block 48) may be preliminarily associated with only one partition 302. In the instance that the partitions created based on the number of programmable register(s) in, for example, an image data processing block results in some partitions 302 having fewer configuration register(s) 304 than other partitions, the partition with more configuration register(s) 304 (e.g., partition 302A) may be subdivided in a similar manner as partitions 1 through N. This decreases the penalty (e.g., high display pipeline configuration time) the display pipeline 36 may pay. Thus, the partitions 302 may be created based on physical location and register balance. Further, in some embodiments, each partition 302 of the configuration buffer 60A may correspond to one group of the image data processing blocks 58 (process block 356).

That is, a partition 302 may load configuration entries 312 into programmable register(s) 50, 54 of one group of image data processing block(s) 58.

Figure 12:
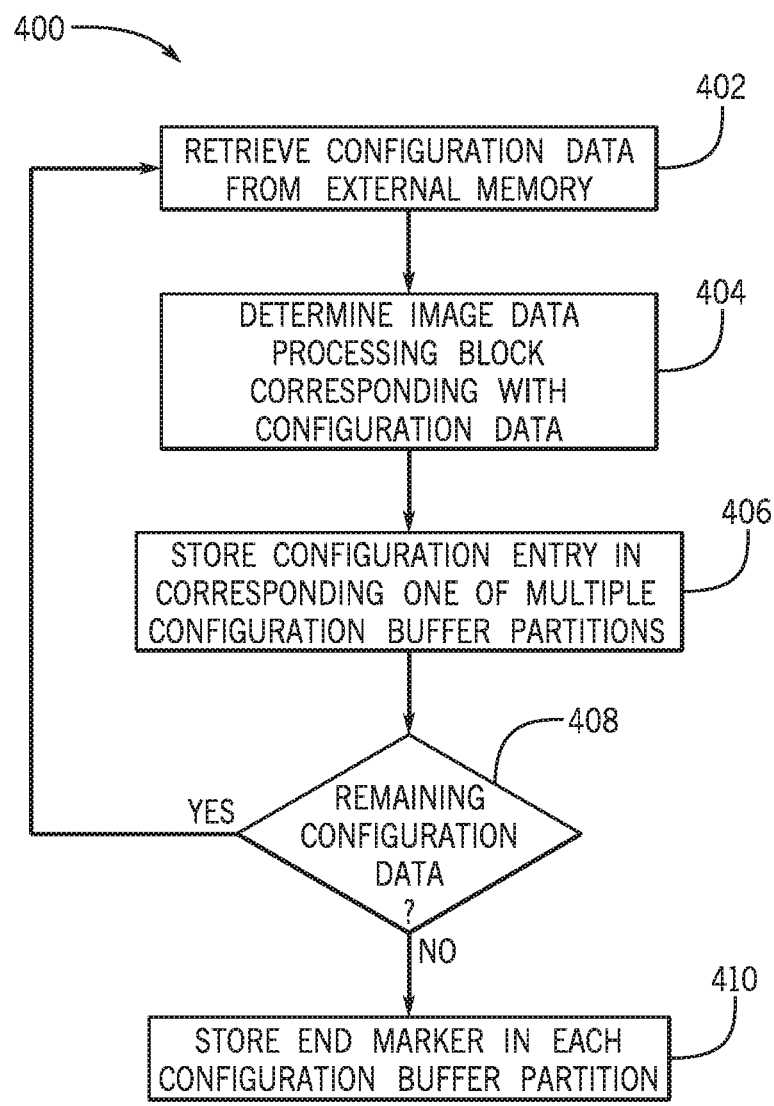
FIG. 12 is a flow diagram of a process for storing configuration data in the partitioned configuration buffer of FIG. 10, in accordance with an embodiment.

The configuration data 308 may be retrieved from memory 38 and stored in the configuration buffer 60 as display pipeline configuration data 308 as described in process 400 of FIG. 12, in accordance with an embodiment. Generally, the process 400 includes retrieving configuration data from external memory 38 (process block 402), determining the image data processing block(s) 58 corresponding with the configuration data (process block 404), storing the display pipeline configuration data 308 in the corresponding partition 302 of the multiple configuration buffer partitions (process block 406), determining whether configuration data remains (decision block 408), and storing the end marker entry 310 in each configuration buffer partitions 302 after configuration data corresponding to an image frame has been stored in the corresponding partition 302 (process block 410). While the process 400 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 400 may be implemented at least in part by a processor core complex 18 that executes instructions stored in a tangible, non-transitory, computer-readable medium, such as the memory 22. In alternative or additional embodiments, at least some steps of the process 400 may be implemented by any other suitable components or control logic, such as another electronic device, and the like.

Thus, in some embodiments, a controller 40 may instruct the display pipeline 36 to retrieve configuration data from external memory (process block 402). The configuration data may be retrieved via direct memory access using the DMA block 46, over the network using the network interface 24, and/or the like. Further, in some embodiments, the configuration data may be analyzed by, for example, by the controller 40 to determine the image data processing block(s) 58 which correspond to the configuration data (process block 404). For example, the configuration data may include information on scaling the image data to fit a display panel which may be used by the BIC/BIS block 52.

The controller 40 may instruct the display pipeline 36 to store a configuration entry in a corresponding partition 302 of the configuration buffer 60A (process block 406). As described above, in some embodiments, the configuration entry may include the address 306 of the corresponding programmable register(s) 50, 54 and the display pipeline configuration data 308 associated with the address 306. For example, when the configuration data may correspond to the BIC/BIS image data processing block 52, configuration entry including information on the relation between the configuration data and the BIC/BIS block 52 may be stored in the partition 302A responsible for loading the configuration entries 312 into the programmable register(s) 54 of the BIC/BIS block 52.

Further, in some embodiments, the controller 40 may determine whether configuration data associated with an image frame remains (decision block 408). If there is remaining configuration data, the process 400 may retrieve the configuration data from external memory 38 via, for example, the controller 40, the DMA block 46, and/or the network interface 24. When the configuration data for an image frame has been completely associated with the image data processing block(s) 58, an end marker entry 310 may be stored in each configuration buffer partition 308 (process block 410). As discussed above, the end marker entry 310 may indicate (e.g., signal) the configuration buffer partition 302 to stop draining configuration entries 312 to the corresponding programmable register(s) 50, 54, for example, during the blanking period as configuration of an entire image frame has been transmitted. The process 400 may be repeated so that each partition 302 may store queued configuration entries corresponding to multiple image frames.

Figure 13:
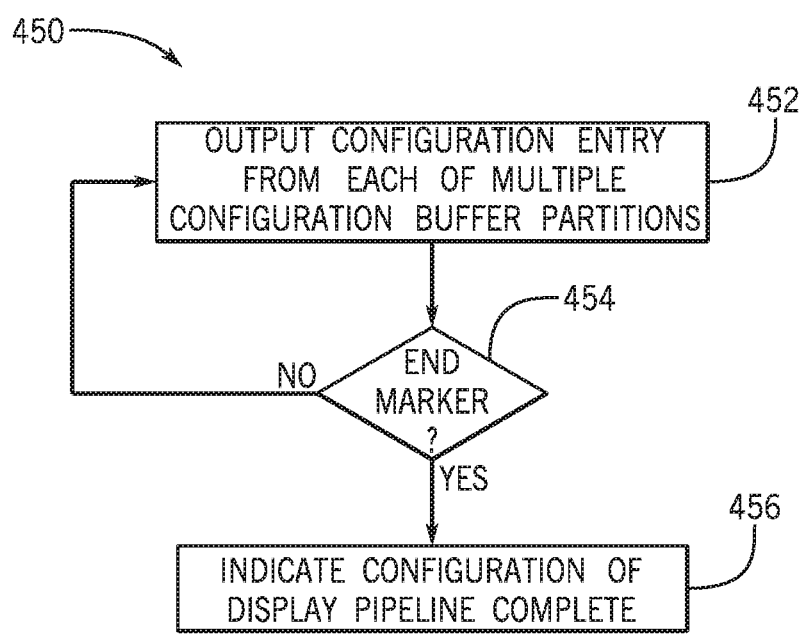
FIG. 13 is a flow diagram of a process for outputting configuration data from the partitioned configuration buffer of FIG. 10, in accordance with an embodiment.

The controller 40 may instruct the display pipeline 36 to output the configuration entries 312 from the configuration buffer 60 once the initiation time has been reached (process block 210). To help illustrate, an example of a process 450 for draining a configuration buffer partition 302 is described in FIG. 13. Generally, the process 450 includes outputting (e.g., draining) the configuration entry from each of the multiple configuration buffer partitions 302 (process block 452), determining whether the end marker entry 310 has been reached (decision block 454), and once the end marker entry 310 has been reached, indicating that the configuration of the entire display pipeline 36 for an image frame is complete (process block 456). While the process 450 is described using steps in a specific sequence, it should be understood that the present disclosure contemplates that the described steps may be performed in different sequences than the sequence illustrated, and certain described steps may be skipped or not performed altogether. In some embodiments, at least some of the steps of the process 450 may be implemented at least in part by a processor core complex 18 that executes instructions stored in a tangible, non-transitory, computer-readable medium, such as the memory 22. In alternative or additional embodiments, at least some steps of the process 450 may be implemented by any other suitable components or control logic, such as another electronic device, and the like.

Thus, in some embodiments, a controller 40 may instruct the display pipeline 36 to output (e.g., drain) configuration entries from each of multiple configuration buffer partitions 302 to the corresponding programmable register(s) 50, 54 (process block 452). Although the configuration buffer 60A is divided, the partitions 302 may be linked, for example, via one set of control logic. For example, the configuration entries 312 may be stored into the appropriate partitions 302 when the partitions 302 are all ready to receive configuration entries 312. Further, the partitions 302, for example, may output the configuration entries 312 to the corresponding programmable register(s) 50, 54 when all partitions 302 are ready to output.

The controller 40 may determine whether the end marker entry 310 stored after an image frame worth of configuration entries 312 has been reached (process block 454). If the end marker entry 310 has not yet been reached, the configuration buffer 60A may continue to output configuration entries 312 from the multiple configuration buffer partitions 302 nearly simultaneously. Once the end marker entry 310 has been reached, an indication (e.g., signal) may be sent, for example, to the controller 40 indicating that the configuration of the entire display pipeline 36 for an image frame is complete (process block 456).

The configuration buffer 60 may be divided into partitions 302 that may effectively function as multiple linked configuration buffers 60. The linked partitions 302 may each be associated with a portion of the display pipeline 36 (e.g., an image process block 58) and may each be responsible for loading configuration entries 312 into the programmable register(s) 50, 54 of a portion of the display pipeline 36. In this manner, the partitions 302 may load the associated programmable register(s) 50, 54 of the display pipeline 36 substantially simultaneously (e.g., in parallel), reducing the time used to configure the entire display pipeline 36. Since configuration of the display pipeline 36 may occur during the blanking period, a reduction in display pipeline configuration time may reduce the blanking period and increase the time for driving pixels of the display, thereby improving perceived image quality (e.g., pixel yield of the display panel).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An electronic device comprising:
    a display panel configured to display a first image using first display image data; and
    a display pipeline coupled to the display panel, wherein the display pipeline is configured to process first image data corresponding to the first image to generate the first display image data, and wherein the display pipeline comprises:
        a first image data processing block comprising a first register, wherein the first image data processing block is programmed to:
            perform a first operation on the first image data corresponding to the first image based at least in part on first configuration data stored in the first register to generate the first image data; and
            transmit the first image data to a second image data processing block;
        the second image data processing block comprising a second register, wherein the second image data processing block is programmed to:
            receive the first image data from the first image data processing block;
            perform a second operation on the first image data corresponding to the first image based at least in part on second configuration data stored in the second register to generate the first display image data; and
            output the first display image data to an output buffer configured to transmit the first display image data to the display panel; and
        a configuration buffer coupled to the first image data processing block and the second image data processing block, wherein the configuration buffer comprises:
            a first configuration buffer partition configured to output a first configuration entry to the first register disposed within the first image data processing block, wherein the first configuration entry is configured to program the first image data processing block to perform the first operation at least in part by storing the first configuration data indicated by the first configuration entry in the first register of the first image data processing block; and
            a second configuration buffer partition configured to output a second configuration entry, wherein the second configuration entry is configured to program, in parallel with the first operation performed by the first image data processing block, the second operation by storing the second configuration data indicated by the second configuration entry in the second register of the second image data processing block.

2. The electronic device of claim 1, wherein:
the first image data processing block comprises a sub-pixel uniformity compensation (SPUC) block;
the second image data processing block comprises a burn-in compensation (BIC) block, a burn-in statistics (BIS) block, or both;
the display panel is configured to display a second image based at least in part on second display image data;
the display pipeline is configured to process second image data corresponding to the second image to generate the second display image data;
the first configuration buffer partition is configured to output a third configuration entry associated with the second image that identifies the first image data processing block to enable the display pipeline to program the first operation by storing third configuration data indicated by the third configuration entry in the first register of the first image data processing block; and
the second configuration buffer partition is configured to output a fourth configuration entry associated with the second image that identifies the second image data processing block to enable the display pipeline to program, in parallel with the first operation performed by the first image data processing block, the second operation by storing fourth configuration data indicated by the fourth configuration entry in the second register of the second image data processing block.

3. The electronic device of claim 2, wherein:
the first image data processing block is programmed to perform the first operation on the first image data corresponding with the first image and the second image data corresponding with the second image differently when the first configuration data and the third configuration data differ; and
the first image data processing block is programmed to perform the second operation on the first image data corresponding to the first image and the second image data corresponding with the second image differently when the second configuration data and the fourth configuration data differ.

4. The electronic device of claim 2, wherein:
the display pipeline is configured to:
process the first image data corresponding to the first image during a processing period; and
program the first operation to be performed by the first image data processing block and the second operation to be performed by the second image data processing block on the first image data corresponding with the first image during a programming period directly before the processing period; and
when the second image is to be displayed directly after the first image:
the first configuration buffer partition is configured to store the first configuration entry associated with the first image and the third configuration entry associated with the second image separated by a first end marker entry directly before the programming period; and
the second configuration buffer partition is configured to store the second configuration entry associated with the first image and the fourth configuration entry associated with the second image separated by a second end marker entry directly before the programming period.

5. The electronic device of claim 2, wherein, when the second image is to be displayed directly after the first image:
the display pipeline is configured to:
process the first image data corresponding to the first image during a first processing period;
process the second image data corresponding with the second image during a second processing period separated from the first processing period by a blanking period; and
program the first operation to be performed by the first image data processing block and the second operation to be performed by the second image data processing block on the second image data corresponding to the second image during a power gating period between the first processing period and a programming period.

6. The electronic device of claim 1, wherein:
the display pipeline comprises:
a third image data processing block programmed to perform a third operation on the first image corresponding to the first image data based at least in part on third configuration data stored in a third register; and
a fourth image data processing block programmed to perform a fourth operation on the first image data corresponding to the first image based at least in part on fourth configuration data stored in a fourth register;
the first configuration buffer partition is configured to output a third configuration entry associated with the first image that identifies the third image data processing block to enable the display pipeline to program the third operation by storing the third configuration data indicated by the third configuration entry in the third register of the third image data processing block; and
the second configuration buffer partition is configured to output a fourth configuration entry associated with the first image that identifies the fourth image data processing block to enable the display pipeline to program, in parallel with the third operation performed by the third image data processing block, the fourth operation by storing the fourth configuration data indicated by the fourth configuration entry in the fourth register of the fourth image data processing block.

7. The electronic device of claim 1, wherein:
the display pipeline comprises:
a first one or more image data processing blocks including the first image data processing block; and
a second one or more image data processing blocks including the second image data processing block;
the first configuration buffer partition is configured to queue configuration entries that indicate the first configuration data to be used to program the first one or more image data processing blocks; and
the second configuration buffer partition is configured to queue configuration entries that indicate the second configuration data to be used to program the second one or more image data processing blocks.

8. The electronic device of claim 1, wherein:
the display pipeline comprises a third image data processing block programmed to perform a third operation on the first image data corresponding to the first image based at least in part on third configuration data stored in a third register; and the configuration buffer comprises a third configuration buffer partition configured to output a third configuration entry associated with the first image that identifies the third image data processing block to enable the display pipeline to program, in parallel with the first operation performed by the first image data processing block and the second operation performed by the second image data processing block, the third operation by storing the third configuration data indicated by the third configuration entry in the third register of the third image data processing block.

9. The electronic device of claim 8, wherein:
the display pipeline comprises a fourth image data processing block programmed to perform a fourth operation on the first image data corresponding to the first image based at least in part on fourth configuration data stored in a fourth register; and
the configuration buffer comprises a fourth configuration buffer partition configured to output a fourth configuration entry associated with the first image that identifies the fourth image data processing block to enable the display pipeline to program, in parallel with the third operation performed by the third image data processing block, the fourth operation by storing the fourth configuration data indicated by the fourth configuration entry in the fourth register of the fourth image data processing block.

10. The electronic device of claim 1, comprising external memory coupled to the display pipeline, wherein:
the external memory is configured to store the first configuration data and the second configuration data; and
the display pipeline comprises a direct memory access block programmed to:
fetch the first configuration data from the external memory to enable the display pipeline to store the first configuration data and a first address that identifies the first register in the first configuration buffer partition as the first configuration entry; and
fetch the second configuration data from the external memory to enable the display pipeline to store the second configuration data and a second address that identifies the second register in the second configuration buffer partition as the second configuration entry.

11. The electronic device of claim 1, comprising:
external memory coupled to the display pipeline, wherein the external memory is configured to store the first image data corresponding to the first image; and
a controller programmed to:
determine a target presentation time of the first image;
determine a target processing initiation time based on the target presentation time, wherein the target processing initiation time occurs a first image data processing period before the target presentation time of the first image;
determine a target programming initiation time based on the target processing initiation time, wherein the target programming initiation time occurs one programming period before the target processing initiation time;
instruct the first configuration buffer partition and the second configuration buffer partition to begin outputting configuration entries associated with the first image in parallel when the target programming initiation time is reached; and
instruct the display pipeline to begin retrieving the first image data from the external memory when the target processing initiation time is reached.

12. The electronic device of claim 11, comprising a power supply configured to output electrical power during operation of the electronic device, wherein:
the display pipeline is programmed to:
process the first image data corresponding to the first image during the first image data processing period; and
process second image data corresponding with a second image to be displayed directly after the first image during a second image data processing period that occurs a vertical blanking period after the first image data processing period, wherein a duration of the second image data processing period is substantially equivalent to the duration of the first image data processing period; and
the controller is programmed to:
instruct the electronic device to electrically disconnect the power supply from the display pipeline after the first image data processing period; and
instruct the electronic device to electrically re-connect the power supply to the display pipeline before the target programming initiation time.

13. The electronic device of claim 1, wherein the electronic device comprises a portable phone, a media player, a personal data organizer, a handheld game platform, a tablet device, a computer, a smartwatch, or any combination thereof.

14. The electronic device of claim 1, wherein the first configuration data and the second configuration data correspond to a first display pipeline configuration queued in the configuration buffer and accessed before an additional display pipeline configuration associated with a second image to be displayed after the first image.

15. The electronic device of claim 1, wherein the first image data processing block comprises a sub-pixel uniformity compensation (SPUC) block, an ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content frame dependent duration (CDFD) block, an ambient light sensing (ALS) block, or any combination thereof.

16. A method for operating a display pipeline implemented in an electronic device, comprising:
instructing, using a controller, the display pipeline to fetch first configuration data and second configuration data associated with an image from external memory coupled to the display pipeline;
instructing, using the controller, the display pipeline to store a first configuration entry comprising the first configuration data in a first configuration buffer partition associated with a first image data processing block and a second configuration entry comprising the second configuration data in a second configuration buffer partition associated with a second image data processing block;
determining, using the controller, a programming initiation time and a processing initiation time based at least in part on a target presentation time of the image;
instructing, using the controller, the first configuration buffer partition to output the first configuration entry and the second configuration buffer partition to output the second configuration entry at the programming initiation time to enable the display pipeline to program operation of the first image data processing block by storing the first configuration data in a first set of registers of the first image data processing block and the second image data processing block by storing the second configuration data in a second set of registers of the second image data processing block in parallel;

instructing, using the controller, the display pipeline to fetch image data corresponding with the image at the processing initiation time;

instructing, using the controller, the display pipeline to use the first image data processing block to process the image data based at least in part on the first configuration data;

instructing, using the controller, the display pipeline to transmit the image data from the first image data processing block to the second image data processing block;

instructing, using the controller, the display pipeline to use the second image data processing block to process the image data based at least in part on the second configuration data; and instructing, using the controller, the display pipeline to output the image data from the second image data processing block to enable an electronic display to display the image at the target presentation time based at least in part on the image data.

17. The method of claim 16, comprising:

instructing, using the controller, the display pipeline to fetch third configuration data and fourth configuration data associated with the image from the external memory;

instructing, using the controller, the display pipeline to store a third configuration entry comprising the third configuration data in the first configuration buffer partition and a fourth configuration entry comprising the fourth configuration data in the second configuration buffer partition, wherein the first configuration buffer partition is associated with a first group of image data processing blocks comprising a third image data processing block and the second configuration buffer partition is associated with a second group of image data processing blocks comprising a fourth image data processing block; and instructing, using the controller, the first configuration buffer partition to output the third configuration entry after the first configuration entry and the second configuration buffer partition to output the fourth configuration entry after the second configuration entry to enable the display pipeline to program operation of the third image data processing block by storing the third configuration data in a third set of registers of the third image data processing block and the fourth image data processing block by storing the fourth configuration data in a fourth set of registers of the fourth image data processing block in parallel.

18. The method of claim 16, wherein:

the first configuration entry comprises the first configuration data and a first address that identifies the first set of registers in the first image data processing block; and the second configuration entry comprises the second configuration data and a second address that identifies the second set of registers in the second image data processing block.

19. The method of claim 16, comprising:

instructing, using the controller, the display pipeline to fetch third configuration data and fourth configuration data associated with the image from the external memory;

instructing, using the controller, the display pipeline to store a third configuration entry comprising the third configuration data in a third configuration buffer partition associated with a third image data processing block and a fourth configuration entry comprising the fourth configuration data in a fourth configuration buffer partition associated with a fourth image data processing block; and instructing, using the controller, the third configuration buffer partition to output the third configuration entry and the fourth configuration buffer partition to output the fourth configuration entry at the programming initiation time to enable the display pipeline to program operation of the third image data processing block by storing the third configuration data in a third set of registers of the third image data processing block and the fourth image data processing block by storing the fourth configuration data in a fourth set of registers of the fourth image data processing block in parallel with the first image data processing block and the second image data processing block.

20. A tangible, non-transitory, computer-readable medium that stores instructions executable by one or more processors implemented in an electronic device, wherein the instructions comprise instructions to:

instruct, using the one or more processors, a display pipeline implemented in the electronic device to fetch first configuration data and second configuration data associated with a first image from external memory coupled to the display pipeline;

instruct, using the one or more processors, the display pipeline to store a first configuration entry comprising the first configuration data in a first configuration buffer partition associated with a first image data processing block and a second configuration entry comprising the second configuration data in a second configuration buffer partition associated with a second image data processing block;

determine, using the one or more processors, a first programming initiation time and a first processing initiation time based at least in part on a first target presentation time of the first image;

instruct, using the one or more processors, the first configuration buffer partition to output the first configuration entry and the second configuration buffer partition to output the second configuration entry at the first programming initiation time to enable the display pipeline to program operation of the first image data processing block by storing the first configuration data in a first set of registers of the first image data processing block and the second image data processing block by storing the second configuration data in a second set of registers of the second image data processing block in parallel;

instruct, using the one or more processors, the display pipeline to fetch first image data corresponding to the first image at the first processing initiation time;

instruct, using the one or more processors, the display pipeline to use the first image data processing block to process the first image data corresponding to the first image, wherein the processing of the first image data occurs based at least in part on the first configuration data;

instruct, using the one or more processors, the display pipeline to transmit the first image data from the first image data processing block to the second image data processing block;

instruct, using the one or more processors, the display pipeline to use the second image data processing block to process the first image data output from the first image data processing block based at least in part on the second configuration data; and instruct, using the one or more processors, the display pipeline to output the first image data from the second image data processing block to enable an electronic display to display the first image at the first target presentation time based at least in part on the first image data.

21. The tangible, non-transitory, computer-readable medium of claim 20, comprising instructions to:

instruct the electronic device to electrically disconnect a power supply from the display pipeline after a first processing period; and instruct the electronic device to electrically connect the power supply to the display pipeline before processing a second image data corresponding to a second image.

22. The tangible, non-transitory, computer-readable medium of claim 20, comprising instructions to:

determine the first target presentation time of the first image;

determine a first processing period based at least in part on a target presentation time, wherein the first processing period occurs before the first target presentation time of the first image;

determine a first target programming initiation time based at least in part on the first processing period, wherein the first target programming initiation time occurs before the first processing period;

instruct the first configuration buffer partition and the second configuration buffer partition to begin outputting configuration entries associated with the first image in parallel when the first target programming initiation time is reached; and instruct the display pipeline to begin retrieving the first image data corresponding to the first image from the external memory when the first processing period is reached.

* * * * *